INVENTORS
MARK WENDELL FARLOW
EARL LEONARD MUETTERTIES

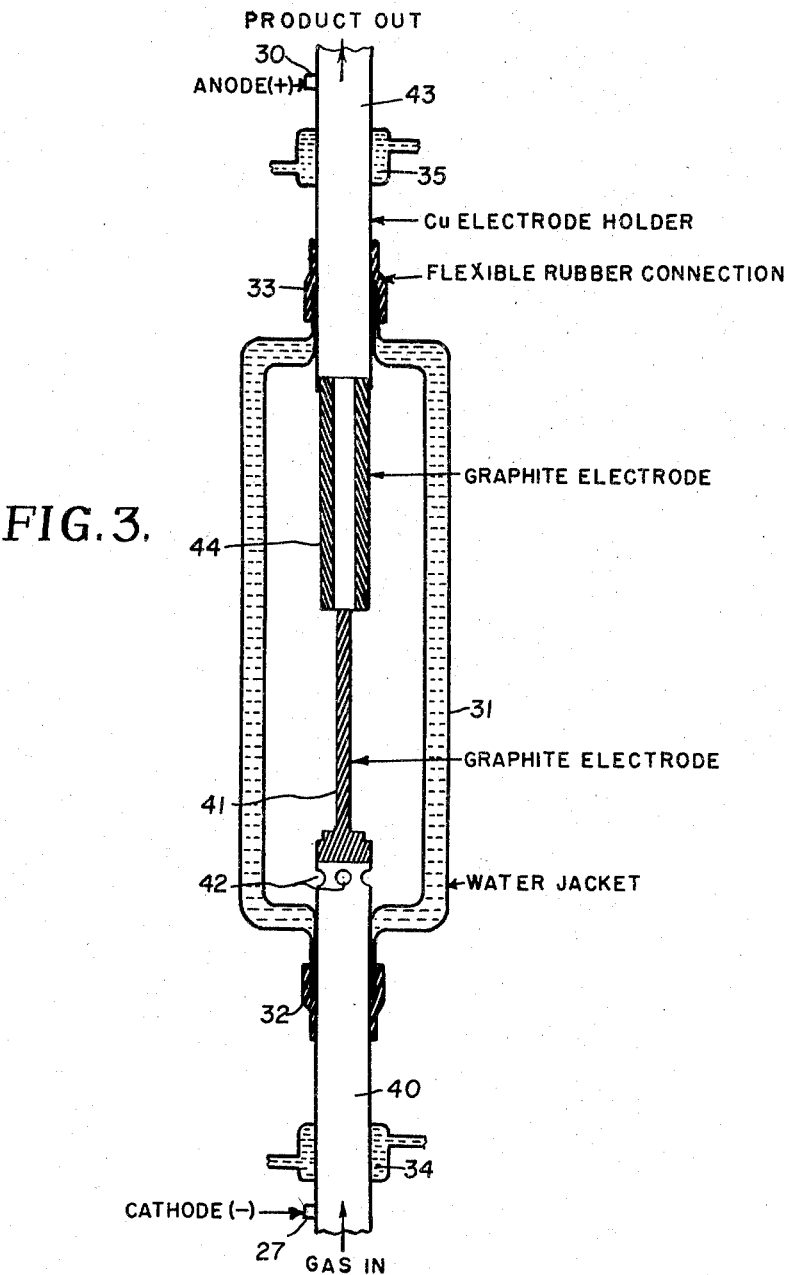

United States Patent Office

2,709,186
Patented May 24, 1955

2,709,186

PREPARATION OF COMPOUNDS OF FLUORINE AND CARBON

Mark Wendell Farlow, Wilmington, and Earl Leonard Muetterties, Hockessin, Del., assignors to E. I. du Pont de Nemours & Company, Wilmington, Del., a corporation of Delaware Application February 10, 1954, Serial No. 409,484

12 Claims. (Cl. 260—653)

This invention relates to a new process for preparing compounds of fluorine and carbon. The present application is a continuation-in-part of applicant's copending application Ser. No. 368,444, filed July 16, 1953, now abandoned.

Compounds containing only carbon and fluorine (hereinafter referred to as fluorocarbons for the sake of brevity) are known to possess considerable usefulness in many fields of applied chemistry. For example, they have demonstrated utility as dielectrics, plastics, surface active agents, and the like. In particular, tetrafluoroethylene has already achieved commercial success in the form of its polymer. However, the lack of an economical synthesis has prevented the development of really large markets for fluorocarbons.

An object of the present invention is to provide a new process of synthesizing fluorocarbons. A further object is to provide an economical process for such synthesis. Other objects will be apparent from the description of the invention given hereinafter.

The above objects are accomplished according to the present invention by reacting at a temperature of at least 900° C. carbon with a binary fluoride of an element of group V–A of the periodic table or a binary fluoride of one of those elements of group VI–A having an atomic number between 16 and 52, inclusive, and isolating the fluorocarbons formed.

The periodic table referred to in this discussion is that published in Deming's "General Chemistry," 5th ed., John Wiley and Sons, publishers. This table is used in many other reference books, such as the Handbook of Chemistry and Physics, 30th ed. (1947), published by the Chemical Rubber Publishing Company. Thus, it will be seen that the binary inorganic fluorides adapted for use in this invention are those of the following elements: nitrogen, phosphorus, arsenic, antimony, and bismuth from group V–A and sulfur, selenium and tellurium from group VI–A.

The process of this invention can be carried out by passing the vaporized inorganic fluoride, if desired in a stream of inert gas such as nitrogen, over carbon heated to a temperature of at least 900° C. The reaction temperature can be as high as can practically be obtained by known means. For example, the inorganic fluoride can be reacted with the carbon electrodes of a carbon arc (operated with either direct or alternating current), where the temperature is estimated to be in the range of 2500° C. to 3500° C.–4000° C. In fact, such an embodiment is preferred since it tends to lead to high conversions to the extremely valuable tetrafluoroethylene. However, the reaction can also be carried out by more conventional means, such as by passing the vaporized inorganic fluoride through a tube containing carbon and heated by suitable means to temperatures in the range of 900° C. to 2000° C., preferably to a temperature of at least 1000° C. Another mode of operation consists in immersing the carbon arc in the liquid or molten inorganic fluoride. Still another mode of operation consists in dropping the liquid or molten inorganic fluoride onto finely-divided carbon heated to the reaction temperature in a suitably arranged reactor. Even more simply, a mixture of carbon and inorganic fluoride can be heated in an open or closed vessel.

Any form of carbon, whether amorphous or crystalline, is suitable for the purpose of this invention. Thus, there can be used coal, graphite, diamond, charcoal, the various forms of carbon black such as lamp black, acetylene black, and bone black. At the lower temperatures, e. g., 900° C.–1500° C., the best results are obtained with active carbon, of which many well-known varieties are available commercially. In general, active carbon is very finely-divided, porous carbon having a total surface area of at least 20 square meters per gram (Hassler, "Active Carbon," Chemical Publishing Co., 1951, p. 127). When using the carbon arc, the activity or state of subdivision of the carbon is apparently of no consequence but the carbon must, of course, possess sufficient conductivity. The carbon need not be rigorously pure and it can, for example, contain the normal amount of ash, e. g., from 0.5% to 4%, by weight, in the case of most active carbons. In certain cases, it is possible to use instead of carbon materials like calcium carbide which furnish carbon in situ in this reaction.

The binary inorganic fluorides suitable for the purposes of this invention can be prepared by methods described in the literature, and some of them are available commercially. Binary fluorides of these elements in any valence state are suitable but it is preferred generally, in the case of the elements of group V–A, to use the binary fluorides of these elements in their lowest valence state, for the reason that such binary fluorides (for example, arsenic III fluoride) are in many cases obtainable without having to resort to the use of free fluorine. Thus, they are much more readily accessible than the higher binary fluorides of elements of group V–A.

Both reactants, that is, the carbon and the binary inorganic fluoride, should preferably be substantially anhydrous, although the reaction can tolerate the presence of some water. It is often desirable to dehydrate the carbon prior to reaction since carbon, especially of the active or absorbent variety, can contain signficant amounts of water even at high temperature.

While the relative proportions of the two reactants are not critical in so far as the course of the reaction is concerned, it is desirable for economic reasons to have the carbon present in excess, in order to utilize as much as possible of the more expensive binary inorganic fluoride. Thus, it is preferred to use the two reactants in such proportions that there is present at least 0.25 gram atom, preferably between 1 and 5 gram atoms, of carbon per gram atom of fluorine. There can be used up to 20 gram atoms of carbon per gram atom of fluorine or even more. However, in special procedures like the submerged arc operation, the binary inorganic fluoride can be present in excess, at least locally.

The reaction normally gives a mixture of fluorocarbons, the preponderant constituents of which are carbon tetrafluoride or tetrafluoroethylene, or mixtures of the two, with in general lesser amounts of hexafluoroethane and octafluoropropane, and sometimes still lesser amounts of other saturated or unsaturated fluorocarbons. In addition the crude reaction product contains in general some unreacted inorganic fluoride, which can be recycled, and the free element whose fluoride was employed, or compounds thereof. The fluorocarbons can be isolated, for example, by passing the gaseous reaction mixture through cold condensers and fractionating the condensate through suitable distilling columns. If desired, the gaseous reaction mixture can be circulated through cold baffles to retain any reaction product which is solid at that temperature, or it can be passed through liquid scrubbing solutions to separate the unchanged inorganic fluoride and the element formed during the reaction. It is usually desirable to effect rapid cooling of the reaction products to avoid side reactions or polymerizations at the high temperatures used. This is particularly the case when very high temperatures, as in the carbon arc, are employed. In such cases, and especially if tetrafluoroethylene is desired as the principal reaction product, very rapid quenching of the reaction mixture is recommended.

The reaction can be carried out at any desired pressure. Normally, atmospheric pressure is used but the pressure can be higher or lower.

The preferred means of carrying out the invention is by passing the binary fluoride in gaseous state through a carbon arc. This is illustrated in the accompanying drawing wherein:

Fig. 3 is a section, more or less diagrammatical, of a second carbon arc adapted for use in the invention.

Figure 1:
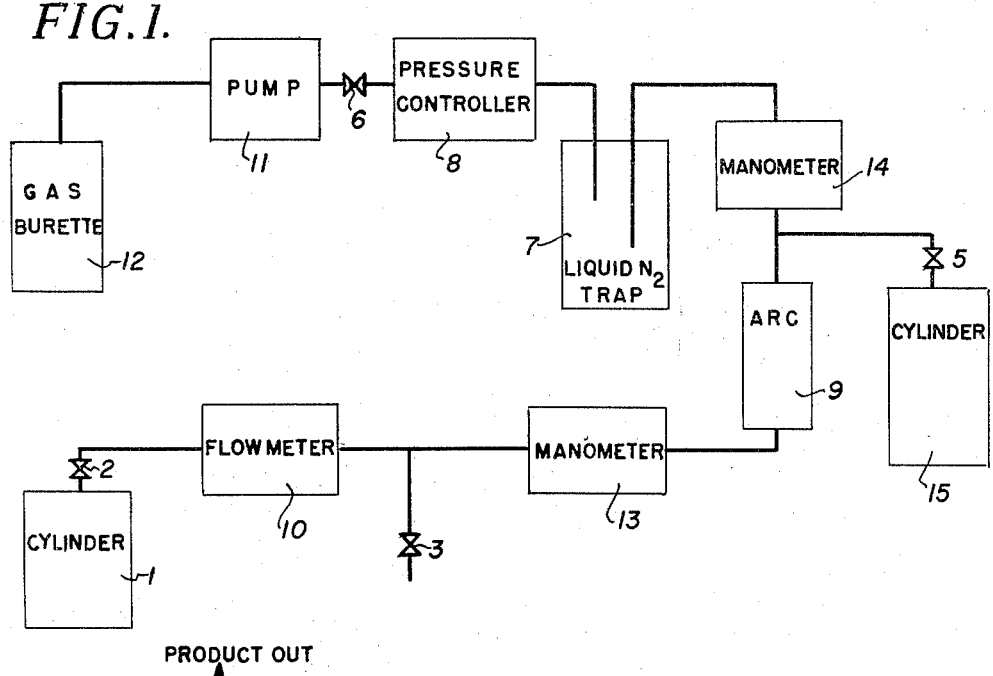
Fig. 1 is a flow sheet illustrating the process.

Referring to Fig. 1, the gas lines are of $5/16''$ (outside diameter) copper tubing. In a typical operation, the binary inorganic fluoride is contained in cylinder 1. Valves 2 and 3 are closed, 5 and 6 are opened. The entire apparatus (with the exception of cylinder 1) is evacuated to remove air, trap 7 is cooled with liquid nitrogen, valve 5 is closed, argon (or other inert gas) is admitted through valve 3 to the desired operating pressure, and pressure controller 8 is set to maintain that desired pressure. The arc 9 is struck, the reactant gas is passed through the arc at the desired rate (flowmeter 10), and the product is condensed in trap 7, except for a small amount of noncondensable gas which passes through controller 8 and pump 11 into gas reservoir 12. During operation, the arc inlet pressure (manometer 13) will be appreciably higher than the exit pressure (manometer 14) because of the constriction involved in the arc passages. When it is desired to stop the reaction the arc current is cut off, valves 2 and 6 are closed, valve 5 is opened, cylinder 15 is cooled with liquid nitrogen, trap 7 is allowed to warm to room temperature, and the volatile product is distilled into cylinder 15. Finally, if desired, cylinder 15 can be pumped to remove traces of argon or other noncondensables, after which the cylinder valve is closed and the product is allowed to warm to room temperature.

Figure 2:
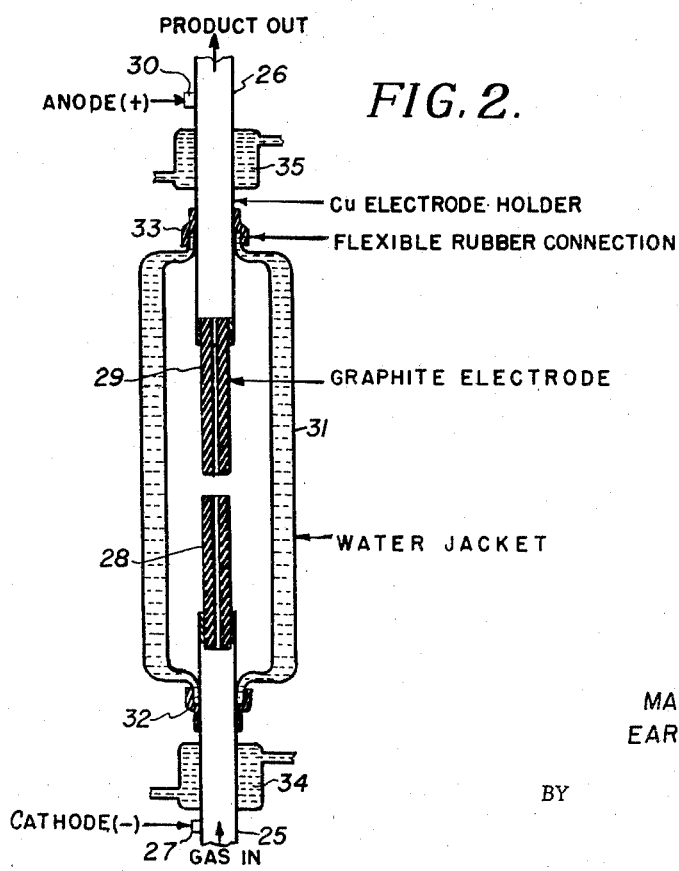
Fig. 2 is a section, more or less diagrammatical, of a carbon arc adapted for use in the invention.

Fig. 2 shows a carbon arc suitable for use in this invention. This arc comprises the sections of copper tubing 25 and 26, which serve as electrode holders. Clamped to the section 25 is the cathode lead wire connection 27 and mounted at the upper end of section 25 is the carbon electrode 28. This electrode is suitably a graphite cylinder, $5/16''$ in diameter by $3''$ long, with a $0.1''$ hole running longitudinally therethrough for passage of gases. The mounting of the electrode 28 in the copper tubing 25 is a conducting, gas-tight joint, suitably of copper foil wrapped around the graphite cylinder, thus forcing the incoming gaseous inorganic fluoride through the longitudinal passage in the electrode 28. Similarly mounted in the section of copper tubing 26 is the electrode 29, likewise provided with a $0.1''$ hole running longitudinally therethrough. The anode lead wire connection 30 is clamped to this section 26.

Encasing the electrodes is the glass water jacket 31 which is held in position by the flexible rubber connections 32 and 33, thereby forming a gas-tight compartment around the electrodes. There are also provided water jackets 34 and 35 mounted on the sections of copper tubing 25 and 26, respectively. The arc is struck by contacting the electrodes 28 and 29 manually through manipulation of one of the two flexible rubber connections 32 and 33, care being taken to avoid contact with uninsulated portions of the apparatus. Thereafter, the electrode gap is controlled manually. A D. C. voltage is applied across the electrodes in the conventional manner.

Fig. 3 shows a somewhat different carbon arc that has given excellent results when used in the process of this invention. This arc is similar to that shown in Fig. 2 except for the sections of copper tubing holding the carbon electrodes and the electrodes themselves. In the arc shown in Fig. 3, the section of copper tubing 40 connected to the cathode lead wire connection 27 and holding the carbon electrode 41, is provided with perforations 42. The electrode 41, suitably made of graphite, is a solid cylinder approximately $1/8''$ in diameter. The section of copper tubing 43 is similar to the copper tubing 26 in Fig. 2 but it holds the graphite electrode 44 which is a hollow cylinder of $5/16''$ outside diameter and $3/16''$ inside diameter. The opening in the electrode 44 is positioned so that it is flush with the end of the electrode 41.

In the arc shown in Fig. 3, the incoming gas flows out of the perforations 42 in the copper tubing 40, around the carbon electrode 41, and enters the hollow electrode 44, passing through the burning arc at this point. The reaction product passes through the electrode 44 and out through the copper tubing 43.

This arc can be operated with the electrode 41 plunged into the hollow electrode 44 a short distance or the electrode 41 may be of the same or larger diameter as the outside diameter of electrode 44 and separated from it by a narrow gap. Also, the electrode 41 may be the anode and the electrode 44 the cathode. It will be understood that specific dimensions given above are merely for purpose of illustration and may be varied appreciably.

The invention is illustrated by the following examples in which all parts are by weight unless otherwise stated.

*Example I*

A tubular nickel reactor was charged with 40 parts of carbon black and heated at 1000° C. for 4 hours under a slow stream of dry nitrogen. Glass traps cooled in liquid nitrogen were connected to the exit side and a slow stream of phosphorus III fluoride was passed through the reaction system at a temperature of 1075° C. to 1150° C., the gaseous products being condensed in the cold traps. In the course of 45 minutes, 4 parts of phosphorus III fluoride were passed through the system and there was obtained 3.5 parts of condensate. This was shown by infrared spectroscopic analysis to contain some unreacted phosphorus III fluoride, carbon tetrafluoride, and some carbon dioxide. The latter was apparently formed by reaction of the carbon with traces of oxygen present in the phosphorus III fluoride.

*Example II*

A slow stream of vaporized arsenic III fluoride was passed through an excess of carbon black heated at 1019° C.–1186° C. in the reactor of Example I. In the course of 3 hours, 18 parts of arsenic III fluoride was passed through the system and there was obtained 3 parts of gaseous reaction product which condensed in the cold traps. The product was shown by infrared analysis to contain, beside unreacted arsenic III fluoride, carbon tetrafluoride as well as some carbon dioxide and hydrogen fluoride, the latter being formed through hydrolysis of the arsenic III fluoride by adventitious moisture.

*Example III*

Gaseous arsenic III fluoride was passed through the carbon arc illustrated in Fig. 2 at a rate of 32 g./hr., an arc inlet pressure of 18 to 35 mm. of mercury, absolute, and an exit pressure of 7 mm. Fifteen to 20% of the arsenic III fluoride was converted to fluorocarbons in a single pass. The fluorocarbons were obtained in a molar ratio of 80–90% tetrafluoroethylene, 5% carbon tetrafluoride, and 0.5% hexafluoroethane.

Example IV

A carbon arc was operated under liquid arsenic III fluoride at 14 to 15 volts and 12 to 15 amperes, the reaction being carried out at atmospheric pressure. The liquid arsenic III fluoride boiled vigorously, and the reflux from an ice water-cooled condenser was returned to the reaction vessel. The uncondensed gases issuing from the condenser contained, in addition to a small amount of unchanged arsenic III fluoride, tetrafluoroethylene and carbon tetrafluoride in a molar ratio of seven to one.

Example V

Nitrogen III fluoride containing about 6% by weight of carbon tetrafluoride, as determined by infrared analysis, was passed at the rate of 61.8 g. per hour through the electric arc illustrated in Fig. 3 having graphite electrodes. The arc was operated at 26 volts and 18 amperes and under a pressure of 12–34 mm. of mercury. The duration of the reaction was 10 minutes, during which 10.3 g. of the reactant gas (9.7 g. of $NF_3$) was passed through the arc. The resulting condensable gas, consisting of unreacted nitrogen III fluoride and fluorocarbons, weighed 8.8 g. It was found by infrared anlysis to contain, by volume, 30% of carbon tetrafluoride, 15% of tetrafluoroethylene and 5% of hexafluoroethane. Allowing for the minor proportion of carbon tetrafluoride present in the initial gas, calculations show that the condensable gas contained, by weight 27.8% of carbon tetrafluoride, 18.9 of tetrafluoroethylene and 8.7% of hexafluoroethane (which corresponds to molar ratios of 56:33:11) and that the conversion of nitrogen III fluoride to fluorocarbons was 51.5%.

Example VI

Phosphorus V fluoride was passed through the electric arc illustrated in Fig. 3 at the rate of 54.4 g. per hour. The arc was operated at 24 volts and 18–20 amperes and under a pressure of 6–35 mm. of mercury. The weight of phosphorus V fluoride passed through the arc was 27.2 g. during a reaction time of 30 minutes. There was recovered 27.2 g. of reaction product containing, in addition to unchanged phosphorus V fluoride, 5% each, by volume, of carbon tetrafluoride and tetrafluoroethylene, corresponding to a 22.2% conversion of the phosphorus V fluoride to fluorocarbons.

Example VII

A graphite tube packed with carbon black was placed in a nickel reactor and a stream of dry nitrogen was passed through the reactor heated to 1000° C. for ten hours to dehydrate the carbon thoroughly and remove air. Glass traps cooled in liquid nitrogen were connected to the exit side of the reactor and a slow stream of sulfur VI fluoride was passed through the system for 3½ hours, during which period the reaction temperature ranged from 950° C. to 1000° C. The gaseous products were condensed in the cold traps. From 18 parts of sulfur VI fluoride, there were obtained 13 parts of a mixture of fluorocarbons. Infrared spectroscopic analysis showed that this mixture consisted preponderantly of carbon tetrafluoride and hexafluoroethane in the molar ratio of about thirty to one.

Example VIII

Gaseous sulfur VI fluoride was passed through the carbon arc illustrated in Fig. 2 at a rate of 47.5 g./hr., an arc inlet pressure of 28–30 mm. of Hg, absolute, and an exit pressure of 6 mm. The arc was operated at 25 volts and 18 amperes. The product from a single pass contained, by volume, 50 parts of unchanged sulfur VI fluoride, 10 parts of tetrafluoroethylene, 25 parts of carbon tetrafluoride, 5 parts of hexafluoroethane, less than 0.5 part of hexafluoropropylene, and 5 to 10 parts of silicon IV fluoride formed through slight attack of the glass portion of the apparatus.

It will be understood that the above examples are merely illustrative and that the present invention broadly comprises reacting at a temperature of at least 900° C. carbon with a binary fluoride of an element of group V–A of the periodic table or a binary fluoride of one of those elements of group VI–A having an atomic number between 16 and 52, inclusive, and isolating the fluorocarbons formed.

Suitable specific binary fluorides in group V–A, other than those in the examples, include arsenic V fluoride, antimony III and V fluorides, and bismuth III and V fluorides. Of these binary fluorides, the most preferred one for use in this invention is arsenic III fluoride which is especially suitable for an economical, cyclic synthesis of tetrafluoroethylene since it is prepared from calcium fluoride, arsenic III oxide and sulfuric acid, and arsenic III oxide is easily regenerated by oxidation of the arsenic formed by reaction of arsenic III fluoride and carbon.

Suitable specific binary fluorides in group VI–A, other than sulfur VI fluoride, include sulfur IV fluoride, selenium IV and VI fluorides, and tellurium IV and VI fluorides. Of these binary fluorides, the most preferred one for use in this invention is sulfur VI fluoride. Sulfur VI fluoride is a gas and therefore well adapted to the process of this invention. Moreover, it is non-toxic and remarkably noncorrosive.

With regard to the reaction conditions, as already stated, the use of a carbon arc is the preferred method of carrying out the invention since it gives higher conversion and a higher yield of tetrafluoroethylene than do other operating conditions. Therefore, the most useful mode of practicing this invention comprises contacting arsenic III fluoride or sulfur VI fluoride with a carbon arc and isolating the fluorocarbons formed.

It will be apparent from the foregoing that an outstanding advantage of this invention is that it provides a process whereby fluorocarbons, and especially the highly valued tetrafluoroethylene, can be synthesized economically.

As many apparently widely different embodiments of this invention may be made without departing from the spirit and scope thereof, it is to be understood that the invention is not limited to the specific embodiments thereof except as defined in the appended claims.

The invention claimed is:

1. Process of synthesizing fluorocarbons which comprises reacting at a temperature of at least 900° C. carbon with a binary fluoride of an element from the group consisting of the elements of group V–A of the periodic table and of those elements of group VI–A of the periodic table having atomic numbers between 16 and 52, inclusive, and isolating the fluorocarbons formed.

2. Process of synthesizing fluorocarbons which comprises reacting a binary fluoride of an element from the group consisting of the elements of group V–A of the periodic table of those elements of group VI–A of the periodic table having atomic numbers between 16 and 52, inclusive, with the carbon electrodes of a carbon arc.

3. Process of synthesizing fluorocarbons which comprises passing in the gaseous state a binary fluoride of an element from the group consisting of the elements of group V–A of the periodic table and of those elements of group VI–A of the periodic table having atomic numbers between 16 and 52, inclusive, through a carbon arc and isolating the fluorocarbons formed.

4. Process of synthesizing fluorocarbons which comprises passing in the gaseous state a binary fluoride of an element from the group consisting of the elements of group V–A of the periodic table and of those elements of group VI–A of the periodic table having atomic numbers between 16 and 52, inclusive, through a tube containing carbon and heated to a temperature of 900° C. to 2000° C., and isolating the fluorocarbons formed.

5. Process of synthesizing fluorocarbons which comprises reacting at a temperature of at least 900° C. carbon with a binary fluoride of an element of group V-A of the periodic table and isolating the fluorocarbons formed.

6. Process of synthesizing fluorocarbons which comprises reacting at a temperature of at least 900° C. carbon with arsenic III fluoride and isolating the fluorocarbons formed.

7. Process of synthesizing fluorocarbons which comprises reacting at a temperature of at least 900° C. carbon with a binary fluoride of an element from the group consisting of those elements of group VI-A of the periodic table having atomic numbers between 16 and 52, inclusive, and isolating the fluorocarbons formed.

8. Process of synthesizing fluorocarbons which comprises reacting at a temperature of at least 900° C. carbon with sulfur VI fluoride and isolating the fluorocarbons formed.

9. Process for the preparation of tetrafluoroethylene which comprises reacting carbon, at a temperature of at least 2500° C., with a binary fluoride of an element from the group consisting of the elements of group V-A of the periodic table and of those elements of group VI-A of the periodic table having atomic numbers between 16 and 52, inclusive, and isolating the tetrafluoroethylene formed.

10. Process according to claim 1 wherein carbon is reacted with the binary fluoride at a temperature of at least 2500° C., the reaction products are very rapidly quenched and tetrafluoroethylene is isolated.

11. Process of synthesizing fluorocarbons which comprises reacting carbon at a temperature of at least 900° C. with phosphorus V fluoride and isolating the fluorocarbons formed.

12. Process of synthesizing tetrafluoroethylene which comprises reacting carbon at a temperature of at least 2500° C. with phosphorus V fluoride, very rapidly quenching the reaction products, and isolating the tetrafluoroethylene.

No references cited.